United States Patent
Chlumecky et al.

(10) Patent No.: US 11,052,893 B2
(45) Date of Patent: Jul. 6, 2021

(54) BRAKE REDUNDANCY IN A LOCOMOTIVE CONSIST

(71) Applicant: NEW YORK AIR BRAKE, LLC, Watertown, NY (US)

(72) Inventors: Wayne Chlumecky, Lacona, NY (US); Vincent Guarrera, Mannsville, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 86 days.

(21) Appl. No.: 16/136,342

(22) Filed: Sep. 20, 2018

(65) Prior Publication Data

US 2020/0094804 A1    Mar. 26, 2020

(51) Int. Cl.
| | |
|---|---|
| *B60T 13/68* | (2006.01) |
| *B60T 13/22* | (2006.01) |
| *B60T 8/17* | (2006.01) |
| *B60T 13/24* | (2006.01) |
| *B61H 13/34* | (2006.01) |

(52) U.S. Cl.
CPC .......... *B60T 13/683* (2013.01); *B60T 8/1705* (2013.01); *B60T 13/24* (2013.01); *B61H 13/34* (2013.01); *B60T 2270/402* (2013.01)

(58) Field of Classification Search
CPC ...... B60T 13/683; B60T 8/1705; B60T 13/24; B60T 13/34; B60T 2270/402
See application file for complete search history.

(56) References Cited

U.S. PATENT DOCUMENTS

| | | | | |
|---|---|---|---|---|
| 4,582,280 | A * | 4/1986 | Nichols | B60L 15/32 105/61 |
| 5,718,487 | A * | 2/1998 | Roselli | B60T 13/665 303/132 |
| 6,401,015 | B1 * | 6/2002 | Stewart | B60T 13/665 303/7 |
| 9,321,468 | B2 * | 4/2016 | Leonard | B61H 13/02 |
| 2007/0063581 | A1 | 3/2007 | Teifke | |

(Continued)

OTHER PUBLICATIONS

International Search Report and Written Opinion Form PCT/ISA/210 and PCT/ISA/237, International Application No. PCT/US2018/051856, pp. 1-11, International Filing Date Sep. 20, 2018, mailing date of search report dated Jun. 21, 2019.

*Primary Examiner* — Thomas J Williams
*Assistant Examiner* — James K Hsiao
(74) *Attorney, Agent, or Firm* — Bond Schoeneck and King PLLC; David Nocilly

(57) ABSTRACT

A redundant brake control system for a locomotive consist that employs corresponding air brake control units in each locomotive that are interconnected by an inter-unit cable extending between the locomotives. Power to the air brake control units may be selectively connected and disconnected to select which air brake control unit is controlling the brakes of the train. The electronic brake valves associated with the air brake control units remain powered so that braking command may be send from either electronic brake valve and responded to by whichever of the air brake control valves have been provided with power. The control of power may be performed by the locomotive control system so that an operator can easily switch control between the air brake control units from the cab of any locomotive in the consist.

14 Claims, 4 Drawing Sheets

(56) References Cited

U.S. PATENT DOCUMENTS

Figure 1:
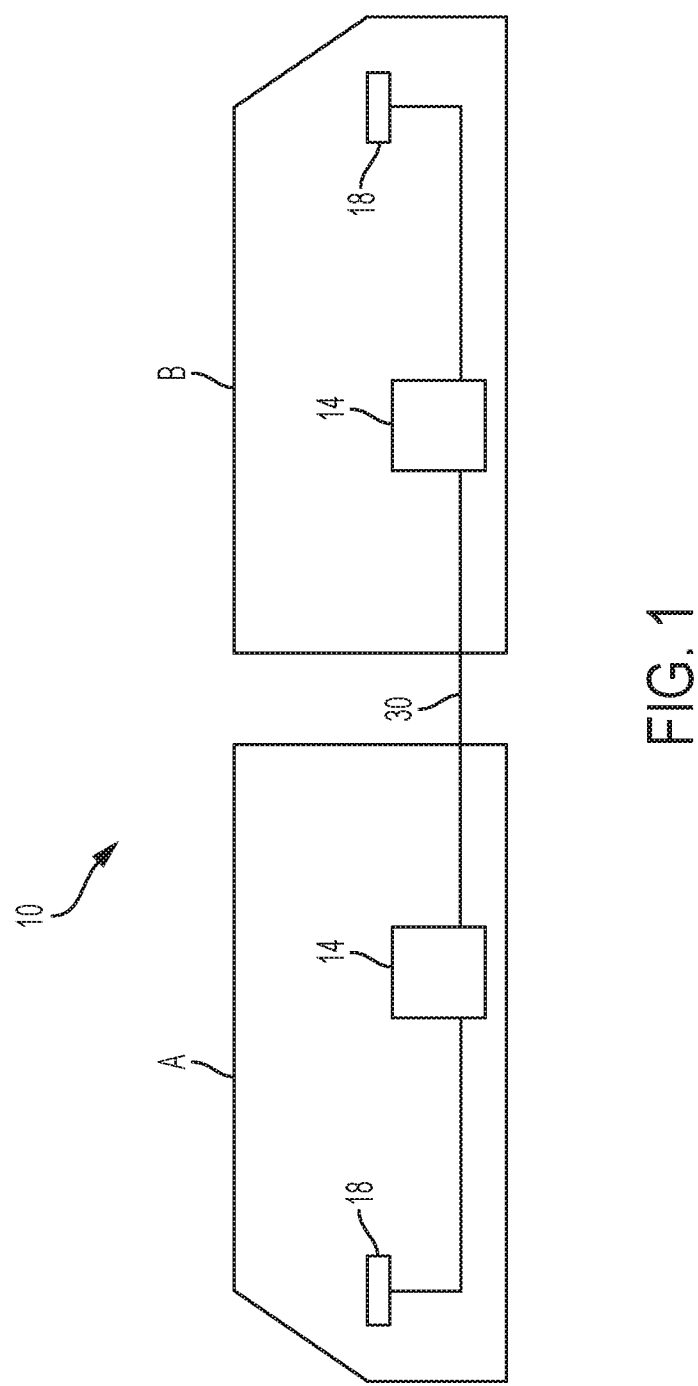

| | | | | |
|---|---|---|---|---|
| 2010/0256842 A1* | 10/2010 | Liberatore | ............ | B60T 13/665 |
| | | | | 701/19 |
| 2012/0265379 A1* | 10/2012 | Chen | ....................... | B61L 3/006 |
| | | | | 701/20 |
| 2013/0018560 A1* | 1/2013 | Smith | ................... | B60T 13/665 |
| | | | | 701/70 |
| 2013/0297163 A1* | 11/2013 | Kull | ......................... | B60T 7/18 |
| | | | | 701/70 |
| 2015/0083529 A1 | 3/2015 | Tione | | |

* cited by examiner

BRAKE REDUNDANCY IN A LOCOMOTIVE CONSIST

BACKGROUND OF THE INVENTION

1. Field of the Invention

The present invention to train braking systems and, more specifically, to a system and method for providing redundancy of braking system control in the locomotive consist of a train.

2. Description of the Related Art

Most trains are powered by multiple locomotives that combine to provide the tractive force needed to move the rail cars. In a typical scenario, one locomotive is designated as the lead locomotive and is also tasked with the responsible of managing all of the braking efforts of the train. More specifically, the driver of the train uses the handles of the electronic brake valve (EBV) of the lead locomotive to operate the air brake control unit of the lead locomotive, which is in control all of the locomotive brake and the rail car brakes of the train. In this arrangement, however, a failure of the air brake control unit of the lead locomotive results in a loss of control of all locomotive and rail car brakes. As there are no electrical connections between the air brake control units of the locomotives of the train, conventional solutions to the loss of the air brake control unit of the lead locomotive problem involve shutting down the braking system of the lead locomotive and then operating the brakes using limited capabilities or physically switching control to another locomotive. Accordingly, there is a need in the art for a more straightforward solution to a failure of the air brake control unit in a lead locomotive of a train.

BRIEF SUMMARY OF THE INVENTION

The present invention can easily address a failure of an air brake control unit by providing redundant control via a second air brake control unit. More specifically, the present invention includes an air brake control unit having a electronic brake valve connector for receiving a braking command signal from a electronic brake valve of a lead locomotive, an electro-pneumatic control unit for operating the braking system of the train in response to the braking command signal received from the electronic brake valve; a relay for selectively connecting and disconnecting a power source to the electro-pneumatic control unit, and an inter-unit connector for establishing an electrical connection to a second corresponding air brake control unit having the structure. As a result, the first electro-pneumatic control unit is configured to respond to a second braking command signal received from the second air brake control unit via the inter-unit connector if the relay has connected power to the electro-pneumatic control unit. The first electronic brake valve connector is also configured to send the braking command signal to the second air brake control unit if the relay has disconnected power from the electro-pneumatic control unit. The relay is controlled externally, such as by a locomotive control system positioned in a cab of the locomotive.

The present invention also includes a system for providing brake redundancy across a locomotive consist. The system uses a first air brake control unit having a first electronic brake valve connector for receiving a first braking command signal from a first electronic brake valve of a first locomotive, a first electro-pneumatic control unit for operating the braking system of a train in response to the first braking command signal received from the first electronic brake valve, a first relay for selectively connecting and disconnecting a first power source to the first electro-pneumatic control unit, and a first inter-unit connector coupled to the first electro-pneumatic control unit and the first electronic brake valve connector. The system also has a second air brake control unit having a second electronic brake valve connector for receiving a second braking command signal from a second electronic brake valve of a second locomotive, a second electro-pneumatic control unit for operating the braking system of the train in response to the second braking command signal received from second electronic brake valve, a second relay for selectively connecting and disconnecting a second power source to the second electro-pneumatic control unit, and a second inter-unit connector coupled to the second electro-pneumatic control unit and the second electronic brake valve connector. The system further includes an inter-unit cable connecting the first inter-unit connector to the second interunit connector. The first air brake control unit is configured to respond to the second braking command signal if the second relay has disconnected power from the second air brake control unit and the first relay has connected power the first air brake unit. The second air brake control unit is configured to respond to the first braking command signal if the first rely has disconnected power from the first air brake control unit and the second relay has connected power to the second air brake control unit. The first relay and the second relay are controlled externally, such as by a locomotive control system positioned in a cab of the locomotive, so that the operator can operate the brakes of the train from either of the locomotives using either of the air brake control units as desired.

BRIEF DESCRIPTION OF THE SEVERAL VIEWS OF THE DRAWING(S)

Figure 2:
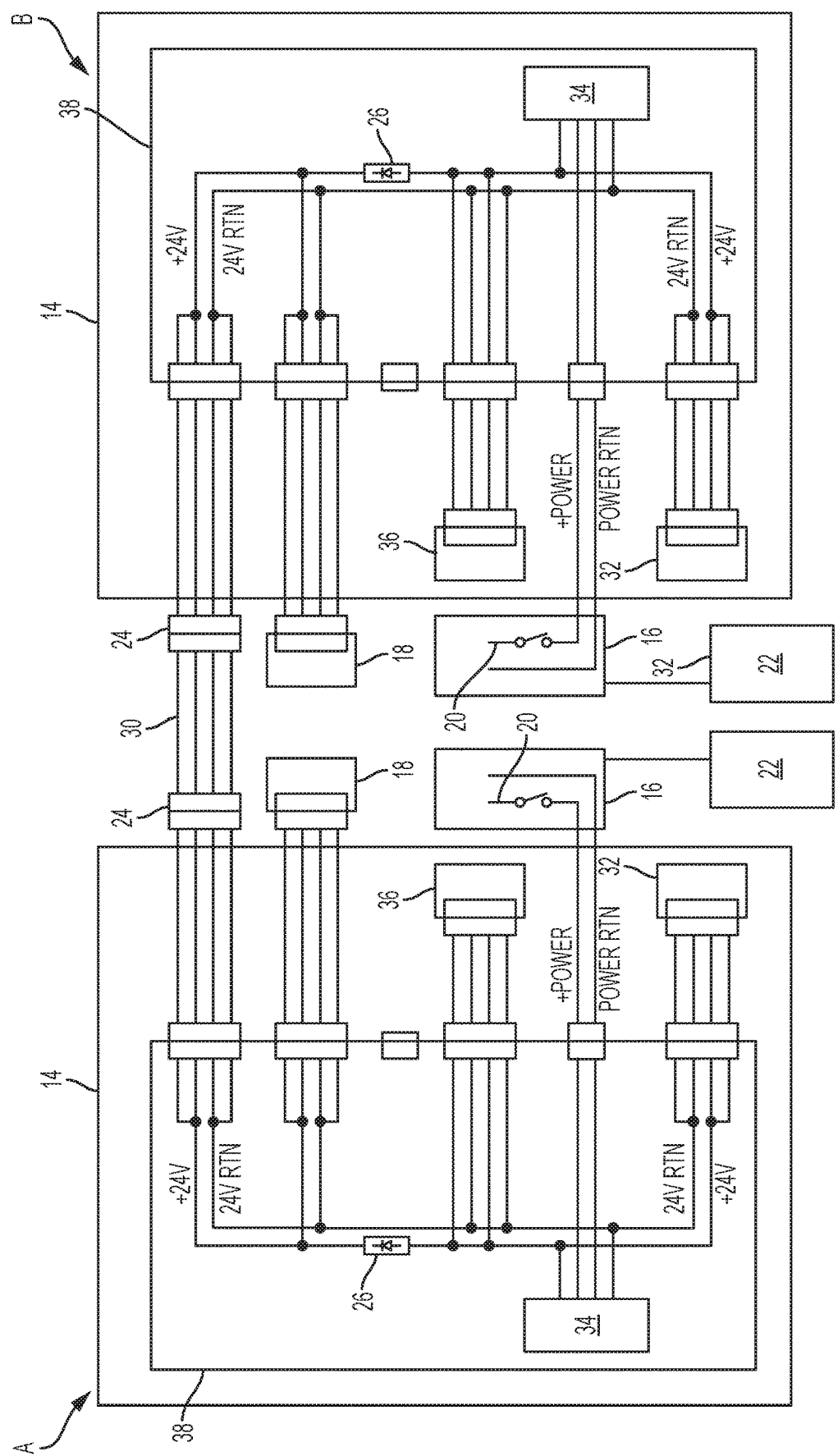
Figure 3:
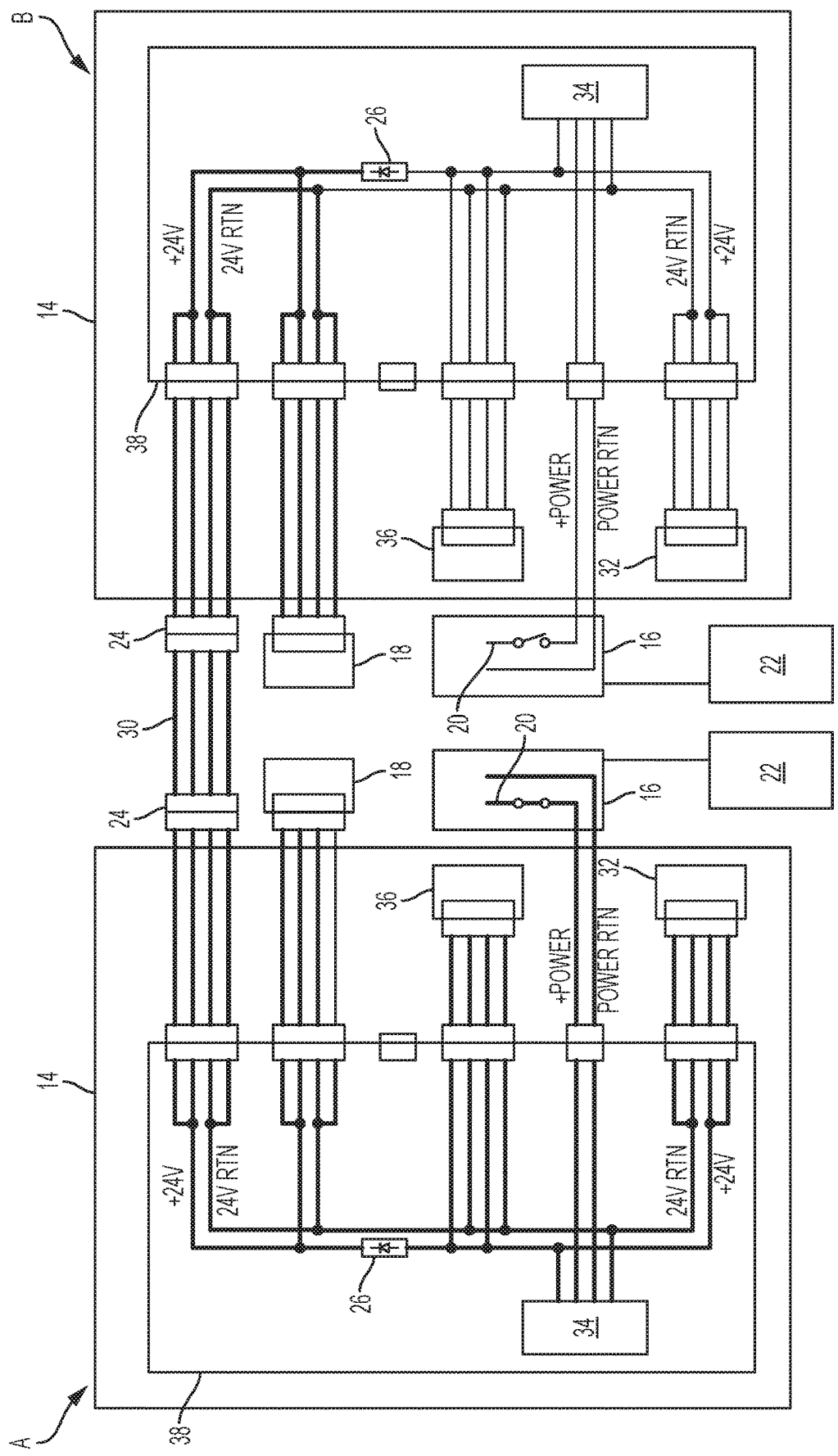
Figure 4:
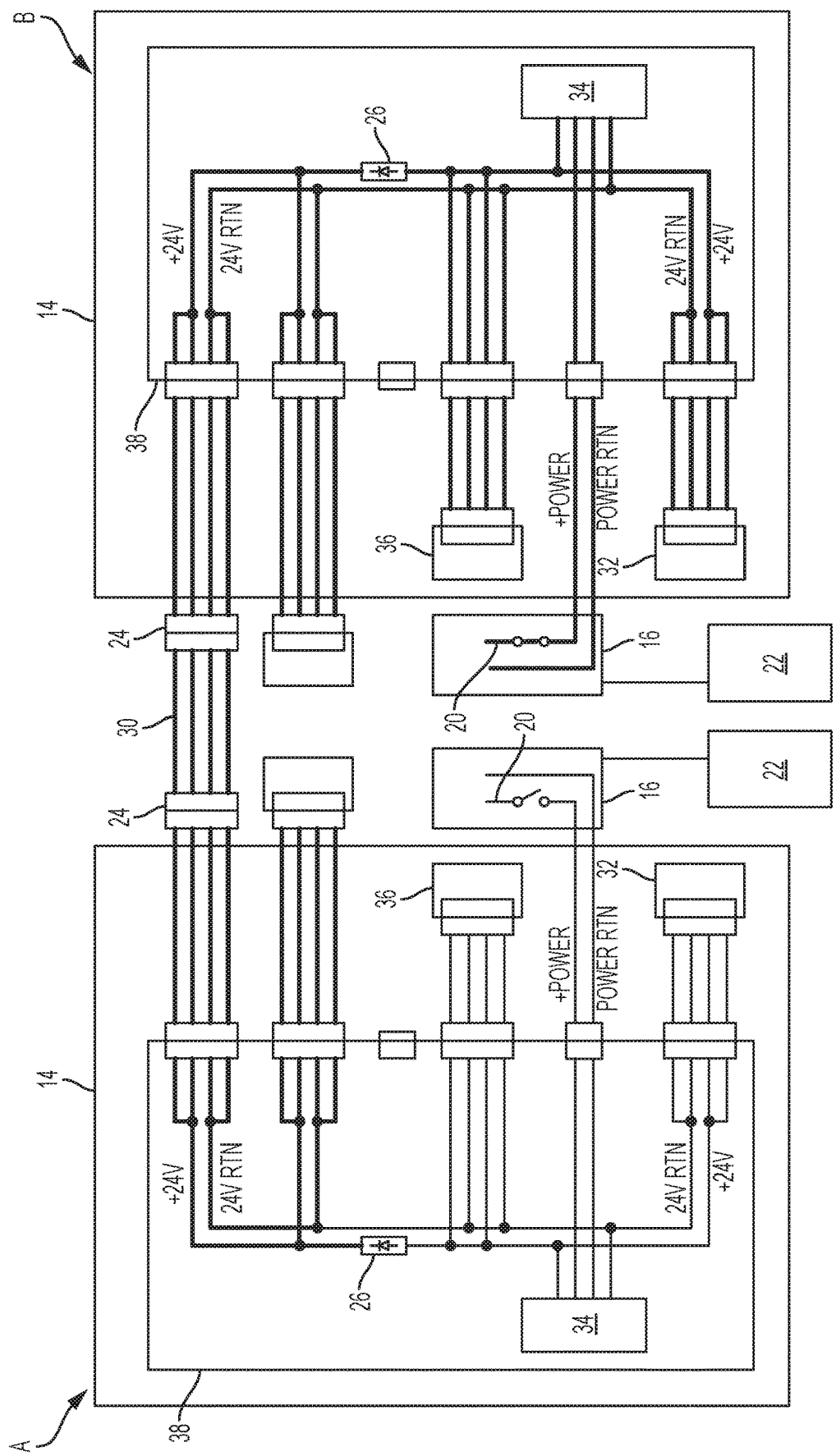

The present invention will be more fully understood and appreciated by reading the following Detailed Description in conjunction with the accompanying drawings, in which:

FIG. 1 is a schematic of a brake redundancy system for a locomotive consist according to the present invention; and FIG. 2 is a schematic of the air brake control units for use in a brake redundancy system for a locomotive consist according to the present invention;

FIG. 3 is a schematic of the air brake control units for use in a brake redundancy system for a locomotive consist where the electronic brake valve of either the lead or trail locomotive may control the train braking system using the electro-pneumatic control unit of the lead locomotive according to the present invention; and FIG. 4 is a schematic of the air brake control units for use in a brake redundancy system for a locomotive consist where the electronic brake valve of either the lead or trail locomotive may control the train braking system using the electro-pneumatic control unit of the trail locomotive according to the present invention.

DETAILED DESCRIPTION OF THE INVENTION

Referring to the figures, wherein like numeral refer to like parts throughout, there is seen in FIGS. 1 and 2, a brake redundancy system 10 for a locomotive consist 12 having at least first and second locomotives (referred to as lead locomotive A and a trail locomotive B for ease of reference) coupled to one or more rail cars (not shown). System 10 comprises an air brake control unit 14 in lead locomotive A that has connectors for coupling to system power 16 and to an electronic brake valve 18 commonly used by the driver in the cab of locomotive A. As in known in the art, electronic brake valve 18 will send control commands based on the movement of user handles to an air brake control unit 14 to control the operation of the locomotive brakes on all locomotives in the consist and the rail car brakes of the train.

Brake redundancy system 10 provides for redundancy by controlling the delivery of power to the various components of the locomotive and train braking system. Control over the interconnection to system power 16 is accomplished via a relay 20, such as a relay coil, that can selectively connect and disconnect air brake control unit 14 of one of lead locomotive A and trail locomotive B from system power 16. As explained below, portions of air brake control unit 14 to which power has been disconnected may then be provided with power from the other of lead locomotive A and trail locomotive B so that electronic brake valve 18 of either of lead locomotive A and trail locomotive B can control the air brake control unit 14 that is still receiving power. As a result, either locomotive may have its air brake control unit 14 removed from service, and the train braking system can be controlled using the other air brake control unit 14 from the electronic brake valve 18 of either locomotive.

Relay 20 may be placed under the control of the locomotive control system 22 of its corresponding locomotive. Locomotive control system 22 may be a conventional train control and energy management system, such as the LEADER® system available from New York Air Brake of Watertown, N.Y., that contains data on the train's length and weight, car types, power distribution along with a detailed track profile for predicting train performance and optimizing train handling and fuel economy. It should be recognized that relay 20 can thus be activated by locomotive control system 22 to connect or disconnect system power 16 from air brake control unit 14.

As seen in FIG. 2, system power 16 includes first and second inputs (A and B) to air brake control unit 14. First input A (such as the return power line) and second input B (such as the positive power line) are fed to a power converter 34 that conditions the incoming power and couples conditioned power to the components of air brake control unit 14. As is known in the art, system power 26 typically involves 24 volt service provided via a powered line and a power return line. It should be recognized that the present invention may be used with any conventional power service arrangements and, for simplicity, only the power couplings to the various components have been illustrated.

Air brake control unit 14 further comprises an inter-unit connector 24 interconnected to system power 16 and to electronic brake valve 18. Inter-unit connector 24 is configured for electronic interconnection to a corresponding inter-unit connector 24 of corresponding air brake control unit 14 in trail locomotive B. For example, inter-unit connector 24 may include a receptacle for coupling to an inter-unit cable 30 that extends from lead locomotive A to trail locomotive B. Inter-unit cable 30 is similarly coupled to a corresponding inter-unit connector 24 of trail locomotive B. A power blocking diode 26 is connected between system power 16 and an inter-unit connector 24 on the positive power line to prevent any back feed to an unpowered air brake control unit 14 from a powered corresponding air brake control unit 14 through inter-unit cable 20. Power blocking diode 26 may thus comprise other conventional electronic devices or circuits for preventing unwanted power backflow.

Air brake control unit 14 additionally comprises an electro-pneumatic control unit 32 that manages the pneumatic interfaces between the locomotive brake system and the locomotive consist. For example, electro-pneumatic control unit 32 controls the locomotive brake cylinders, the train brake pipe, the independent application and release pipe, and the actuating pipe. Thus, electro-pneumatic control unit 32 is responsible for implementing the braking commands received from electronic brake valve 18 in response to movement of the brake handles by an operator. Disconnection of system power 16 by operation of relay 20 prevents electro-pneumatic control unit 32 from responding to brake commands received from electronic brake valve 18.

Air brake control unit 14 further includes a relay control portion 36. Relay control portion 36 contains application specific settings for the brake system and configures and monitors the other nodes within the system. Relay control portion 36 also contains relays and drivers to interface to electrical inputs and outputs to the vehicle systems. As seen in FIG. 2, the various power couplings may be arranged is a power supply junction box 38 incorporated into air brake control unit 14 to couple to power the various brake control components.

Locomotive control system 22 may thus control whether air brake control unit 14 on lead locomotive A or corresponding air brake control unit 14 on trail locomotive B is powered for the purposes of controlling the braking systems of the train. As electronic brake valve 18 of lead locomotive A and corresponding electronic brake valve 18 of trail locomotive B remains powered, either may be used to send brake commands. As a result, an operator may select and use either air electronic brake valve 18 of lead locomotive A or corresponding electronic brake valve 18 trail locomotive B to operate whichever of air brake control unit 14 of lead locomotive A or corresponding air brake control unit 14 of trail locomotive B has been powered by locomotive control system 22.

The present invention thus allows for both electronic brake valves 18 of locomotive A and locomotive B to be powered, but only one of power supply junction box 38, electro-pneumatic control unit 32 and relay control portion 36 at a time. Locomotive control system 22 of locomotive A and locomotive control system 22 of locomotive B coordinate which air brake control unit 14 is to be fully powered.

Referring to FIG. 3, when air brake control unit 14 of locomotive A is to be powered, locomotive control system 22 of locomotive A will energize relay 20 of locomotive A, to provide system power to power supply converter 24 and power supply junction box 38 of locomotive A. This, in turn, provides 24 volt power to electro-pneumatic control unit 32 of locomotive A, relay control portion 36 of locomotive A, air brake control unit 14 of locomotive A. Inter-unit cable 30 allows power from locomotive A to power the relevant portions of air brake control unit 14 of locomotive B. Power blocking diode 26 of locomotive B prevents power provided by locomotive A from reaching the portion of air brake control unit 14 of locomotive B that are to remain unpowered. As a result, electronic brake valve 18 of either locomotive A or locomotive B is powered and thus can provide brake commands to electro-pneumatic control unit 32 of locomotive A without any command being acted upon by electro-pneumatic control unit 32 of locomotive B because the present invention has prevented electro-pneumatic control unit 32 of locomotive B from receiving power.

Referring to FIG. 4, when air brake control unit 14 of locomotive B is to be powered, locomotive control system 22 of locomotive B will energize relay 20 of locomotive B to provide system power to power supply converter 24 of locomotive B and power supply junction box 38 of locomotive B. This, in turn, provides 24 volt power to electro-pneumatic control unit 32 of locomotive B, relay control portion 36 of locomotive B, and air brake control unit 14 of locomotive B. Inter-unit cable 30 allows power from locomotive B to power the relevant portions of air brake control unit 14 of locomotive A. Power blocking diode 26 of locomotive A prevents power provided by locomotive B from reaching the portion of air brake control unit 14 of locomotive A that are to remain unpowered. As a result, electronic brake valve 18 of either locomotive A or locomotive B is powered and thus can provide brake commands to electro-pneumatic control unit 32 of locomotive B without any command being acted upon by electro-pneumatic control unit 32 of locomotive A because the present invention has prevented electro-pneumatic control unit 32 of locomotive A from receiving power.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. An air brake control unit, comprising:
   a first electronic brake valve connector for receiving a first braking command signal from a first electronic brake valve of a first locomotive;
   a first electro-pneumatic control unit for operating a braking system of a train in response to the first braking command signal received from the first electronic brake valve;
   a relay for selectively connecting and disconnecting a power source of the first locomotive to the first electro-pneumatic control unit so that the first electro-pneumatic control unit does not receive any power from the first locomotive when the relay has disconnected the power source from the first electro-pneumatic control unit; and
   a first inter-unit connector for establishing a power connection between the first electronic brake valve and a second electro-pneumatic control unit of a second air brake control unit of a second locomotive as well as a power connection between a second electronic brake valve of the second locomotive and the first electro-pneumatic control unit so that the first electro-pneumatic control unit can receive power from the second locomotive.

2. The air brake control unit of claim 1, wherein the first electro-pneumatic control unit is configured to respond to a second braking command signal received from the second air brake control unit via the first inter-unit connector if the relay has connected power to the first electro-pneumatic control unit.

3. The air brake control unit of claim 2, wherein the first electronic brake valve connector is configured to send the first braking command signal to the second electro-pneumatic control unit of the second air brake control unit if the relay has disconnected power from the first electro-pneumatic control unit.

4. The air brake control unit of claim 3, wherein the relay is controlled externally.

5. The air brake control unit of claim 4, wherein the relay is controlled externally by a locomotive control system positioned in a cab of the first locomotive.

6. The air brake control unit of claim 4, further comprising a relay control portion including application specific settings.

7. The air brake control unit of claim 6, wherein the electronic brake valve connector, electro-pneumatic control unit, and relay are arranged in a power supply junction box.

8. The system of claim 7, wherein the second air brake control unit is configured to respond to the first braking command signal if the first relay has disconnected power from the first air brake control unit and the second relay has connected power to the second air brake control unit.

9. The system of claim 6, wherein the first air brake control unit is configured to respond to the second braking command signal if the second relay has disconnected power from the second air brake control unit and the first relay has connected power the first air brake control unit.

10. The system of claim 9, wherein the first relay and the second relay are controlled externally by a locomotive control system positioned in a cab of the locomotive.

11. The system of claim 10, further comprising a relay control portion including application specific settings.

12. The system of claim 11, wherein the electronic brake valve connector, electro-pneumatic control unit, and relay are arranged in a power supply junction box.

13. A system for providing brake redundancy in a locomotive consist, comprising:
    a first air brake control unit having a first electronic brake valve connector for receiving a first braking command signal from a first electronic brake valve of a first locomotive, a first electro-pneumatic control unit for operating the braking system of a train in response to the first braking command signal received from the first electronic brake valve, a first relay for selectively connecting and disconnecting a first power source of the first locomotive to the first electro-pneumatic control unit so that the first electro-pneumatic control unit does not receive any power from the first locomotive when the relay has disconnected the power source from the first electro-pneumatic control unit, and a first inter-unit connector coupled to the first electro-pneumatic control unit and the first electronic brake valve connector so that the first electro-pneumatic control unit can receive power from a second locomotive;
    a second air brake control unit having a second electronic brake valve connector for receiving a second braking command signal from a second electronic brake valve of the second locomotive, a second electro-pneumatic control unit for operating the braking system of the train in response to the second braking command signal received from second electronic brake valve, a second relay for selectively connecting and disconnecting a second power source of the second locomotive to the second electro-pneumatic control unit so that the second electro-pneumatic control unit does not receive any power from the second locomotive when the second relay has disconnected the second power source from the second electro-pneumatic control unit, and a second inter-unit connector coupled to the second electro-pneumatic control unit and the second electronic brake valve connector so that the second electro-pneumatic control unit can receive power from the first locomotive; and an inter-unit cable connecting the first inter-unit connector to the second interunit connector.

14. The system of claim 13, wherein the first relay and the second relay are controlled externally.

* * * * *